United States Patent [19]

Irokawa et al.

[11] 4,419,591
[45] Dec. 6, 1983

[54] MULTITERMINAL DC POWER TRANSMISSION SYSTEM

[75] Inventors: Shoichi Irokawa, Nagareyama; Koji Imai, Fuchu; Takeichi Sakurai, Tokyo; Kiyoshi Goto, Musashino, all of Japan

[73] Assignee: Tokyo Shibaura Denki Kabushiki Kaisha, Kawasaki, Japan

[21] Appl. No.: 299,142

[22] Filed: Sep. 3, 1981

[30] Foreign Application Priority Data

Sep. 4, 1980 [JP] Japan .................. 55-121711

[51] Int. Cl.³ .............................. H02J 3/36
[52] U.S. Cl. ........................ 307/45; 307/82; 363/35
[58] Field of Search ............ 363/35, 51; 307/45, 307/58, 82, 19, 33

[56] References Cited

U.S. PATENT DOCUMENTS 3,526,780  9/1970  Uhlmann et al. ............ 363/35
4,019,115  4/1977  Lips ............................ 363/35

OTHER PUBLICATIONS

Lamm et al., "Some Aspects of Tapping of H.V.D.C. Transmission Systems," 8 Direct Current 124 (May 1963).
Foerst et al., "Multiterminal Operation of HVDC Converter Station," 7 IEEE Transactions on Power Apparatus and Systems 1042 (Jul. 1969).
Reeve, "Multiterminal HVDC Power Systems," 99 IEEE Transactions on Power Apparatus and Systems, 729 (Mar./Apr. 1980).

*Primary Examiner*—William H. Beha, Jr.
*Attorney, Agent, or Firm*—Finnegan, Henderson, Farabow, Garrett & Dunner

[57] ABSTRACT

Control units are provided associative with forward and inverse converters in a multiterminal DC power transmission system, respectively. The control units set different constant voltages in the converters. Further, the minimum value of the constant voltage set values in the forward converters is set at a value larger than the maximum value of the constant voltage set values in the inverse converters.

5 Claims, 29 Drawing Figures

MULTITERMINAL DC POWER TRANSMISSION SYSTEM

BACKGROUND OF THE INVENTION

The present invention relates to a multiterminal DC power transmission system in which AC power transmitted from an AC power system on the power transmission side is converted into corresponding DC power by a rectifier and the DC power transmitted is converted into corresponding AC power by using an inverter on the power receiving side.

Figure 1:
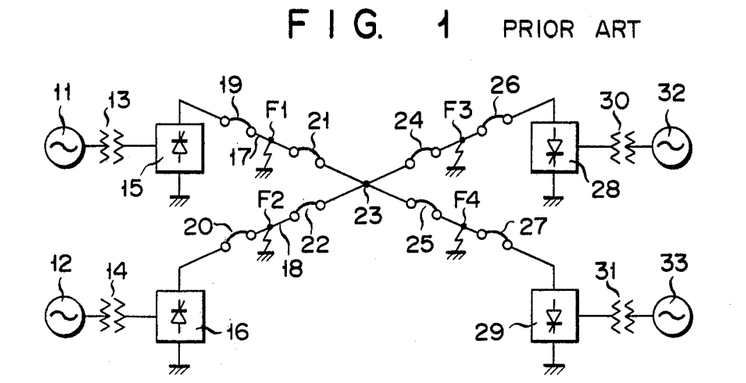
FIG. 1 is a block diagram of an example of a multiterminal DC power transmission system to which the present invention is applicable.

A typical construction of the multiterminal DC power transmission system is a 4-terminal DC power transmission system as shown in FIG. 1. In the figure, AC power of AC systems 11 and 12 on the power transmitting side is coupled with rectifiers 15 and 16 through transformers 13 and 14. The AC power coupled is converted into corresponding DC power by the rectifiers 15 and 16 and supplied through circuit breakers 19 and 20 to ends of DC power transmission lines. The other ends of the DC transmission lines 17 and 18 are connected together at a connection point 23 through circuit breakers 21 and 22. The DC power transmission lines 17 and 18 further extend to the power receiving sides through corresponding circuit breakers 24, 25, 26 and 27 and coupled with inverters 28 and 29, respectively. The DC power transmitted is converted into corresponding AC power by the inverters and coupled with AC systems 32 and 33 through transformers 30 and 31, respectively. Incidentally, the rectifiers 15 and 16 on the power transmission side are each called as a forward converter and the inverters 28 and 29 on the power receiving side are each called an inverse power converter.

In order to stably operate the 4-terminal DC power transmission system, the DC power supplied through the rectifiers 15 and 16 must harmonically be supplied to the power receiving side through the inverters 28 and 29, respectively. This harmonical supply is also necessary not only for a case that the rectifiers 15 and 16 and the inverters 28 and 29 operate in a normal condition and also for a case that a fault such as ground fault F1 occurs on the DC transmission line 17 connected to the rectifier 15. In the case of the fault F1, only the DC power from the remaining rectifier 16 must well be parted and distributed to the inverters 28 and 29. To this end, the information representing operating conditions of the respective converters 15, 16, 28 and 29 must be collected through an information transmission system (not shown) to a central control unit and proper operating commands formed based on these items of the information must be applied to the converters 15, 16, 28 and 29. When a fault occurs in the power transmission system, the DC breaker quickly disconnects the fault location from the power transmission system. In this case, the fault information is supplied to the central control unit. Then, the central control unit issues commands to control the converters in order to keep a stable operation of the power transmission system against the fault. This necessitates expensive means for high speed information transmission and processing in the information transmission system and the central control unit. Therefore, desired is a control system which can obtain stable operating points on the DC voltages and currents in the converters, independently of the central processing unit and the information transmission system in an emergency.

In a known control system, all the converters have constant current control devices. The sum of the constant current control set values of the forward converters (rectifiers) are selected at a given value $\Delta I$ (current margin) larger than the sum value of the constant current control values of the inverse converters (inverters). The converter with the lowest voltage determines the DC voltage in the power transmission system, while the remaining converters effect the constant current control in the power system.

Figure 2:
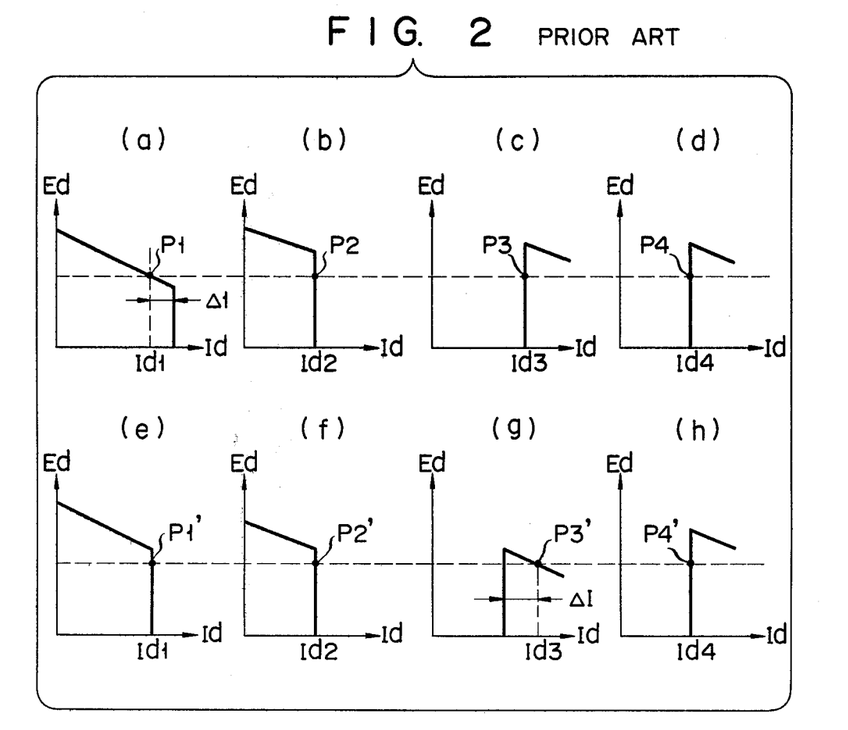
FIGS. 2(a) to 2(h) are characteristic curves illustrating an operation of the system shown in FIG. 1 by using a prior control system.

FIG. 2 shows characteristic curves when the above-mentioned control system is applied for the power transmission system shown in FIG. 1. In the characteristic curves of FIGS. 2(a) to 2(d), the forward converter 15 determines the voltage in the power transmission system (FIG. 2(a)), while the remaining converters 16, 28 and 29 perform the constant current control (FIGS. 2(b), to 2(d). In this case, the operating points are P1 to P4, respectively. In FIGS. 2(e) to 2(h), the inverse converter 28 determines the voltage by a fixed marginal phase angle control (FIG. 2(g)), while the remaining converters perform the constant current control (FIGS. 2(e), 2(f) and 2(g)). In this case, the operating points are P'1 to P'4, respectively. Further, the voltage in the DC system is controlled by adjusting tap positions of the transformers. In a normal operating mode, a single converter determines the voltage in the power transmission system, while the remaining converters control the current, thereby obtaining a stable operation.

This control system, however, is not suitable for the case where the fault location is quickly disconnected from the power transmission system by using the DC breaker. Specifically, when the ground fault in the DC system or the fault converter is quickly removed, it is very difficult to obtain new stable points after the fault is removed.

Assumed that, in FIG. 1, when the ground fault F1 occurs in the DC system, and the fault F1 is removed quickly by the DC breakers 19 and 21. In this case, if the power transmission system operates as indicated by the characteristic curves as shown in FIGS. 2(a) to 2(d), the DC current values Id1 of the forward converter is zero. For this reason, a relationship between the current value Id1 of the forward converter 16 and the current values Id3 and Id4 of the inverse converters {Id2−(Id3+Id4)} is negative and the current margin $\Delta I$ is not secured. Therefore, at a normal voltage, stable operating points can not be obtained and the direction of power flow may be inverted. In another case where the ground fault F4 takes place in the DC power transmission system in FIG. 1 and it is quickly removed by means of the DC breakers 25 and 27, if the power transmission system operates as indicated by the characteristic curves in FIGS. 2(e) to 2(h), the DC current Id4 of the inverse converter 29 becomes zero. Therefore, the sum of the output currents Id1 and Id2 of the forward converters 15 and 16 flows into the inverse converter 29, so that the sound converter 28 is forced to be in an overload condition.

For this reason, before removing the fault by the DC breaker, the information representing the fault and operating conditions of the respective converters must be transmitted to the central control unit where a power redistribution is calculated and the central control unit must give new set values of the DC currents to the converters. In this case, however, time consuming factors such as transmission delay, acknowledgements of signals greatly damage the merit of the high speed operable DC breakers provided. Furthermore, the reduction of the quantity of power transmission due to the continuity of the fault provides a great hindrance in stably supplying the power.

For an arm short-circuiting fault of the forward converter as well as the ground fault in the DC system, the converter must be gate-blocked at high speed to disconnect the converter from the DC system for obtaining a correct current distribution. For a fault in the transmission system, a set value of the constant current control unit associated with only the specific converter must be changed. If not done so, the direction of power flow is inverted or the overload problem of the inverse converter arises.

Figure 3:
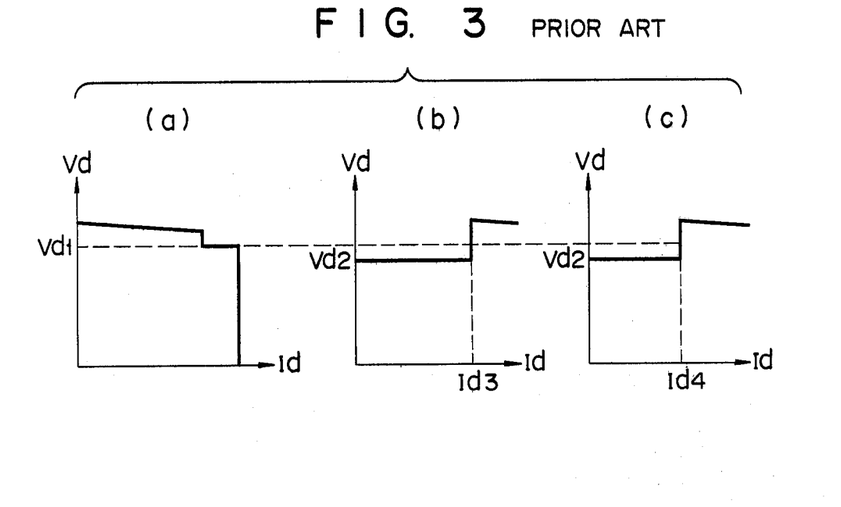
FIGS. 3(a) to 3(c) are characteristic curves illustrating an operation of another prior control system.

In another known control system, the converters are provided with current adjustors, respectively. When the rectifier 15 in FIG. 1 is disconnected from the power transmission system, the operating voltages of the inverters 28 and 29 are set at values lower than the set values. And the operating current of the inverter is reduced by using the current adjustor. FIG. 3 shows control characteristics of the power transmission system incorporating the control system. FIGS. 3(b) and 3(c) show current voltage characteristic curves of the inverters 28 and 29, respectively. In a stationary condition, the system voltage is set at VD1 and the inverters 28 and 29 receive the set currents Id3 and Id4 from the rectifiers 15 and 16, respectively. When the fault F1 takes place and the rectifier 15 is disconnected from the system, the operating voltages of the inverters 28 and 29 are reduced to Vd2 (<VD1). As a result, the current of the inverters 28 and 29 reduces from the set values Id3 and Id4 along the curve of the voltage Vd2. Generally, the impedances of the inverters 28 and 29, as seen from the rectifier 16, are different from each other. For example, when the impedance of the inverter 28 is lower than that of the other inverter, the current from the rectifier 16 flowing into the inverter 28 is larger than the current into the other inverter. In an extreme case, the current Id4 flowing into the inverter 29 may be zero.

SUMMARY OF THE INVENTION

Accordingly, an object of the present invention is to provide a multiterminal DC power transmission system which can optimumly operate in a stationary condition and can maintain the stable operation without any assistance of the information transmission system and the central control unit.

According to the present invention, the above object can be attained by a multiterminal DC power transmission system having a plurality of forward converters and inverse converters, in which the forward and inverse converters are respectively provided with control units including constant voltage control means, different constant voltages are set in the converters by the constant voltage control means and the minimum value of those constant voltage set values of the forward converters is larger than the maximum value of those constant voltage set values of the inverse converters.

DETAILED DESCRIPTION OF THE PREFERRED EMBODIMENTS

Figure 4:
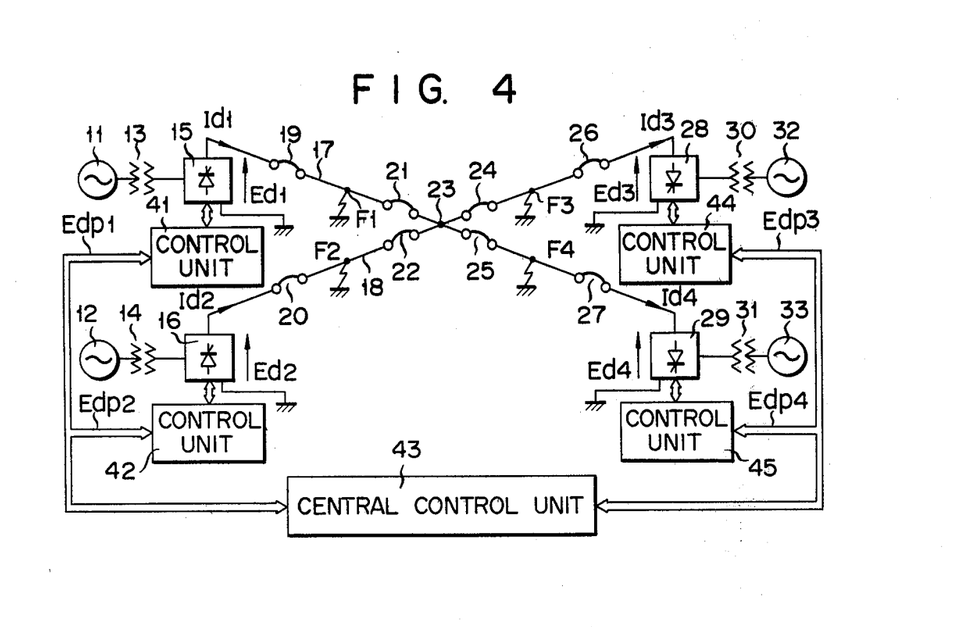
FIG. 4 is a block diagram of an embodiment of a multiterminal DC power transmission system according to the present invention.

Referring to FIG. 4, there is shown a block diagram of a 4-terminal DC power transmission system incorporating the present invention. In the figure, like reference numerals are used to designate like portions in FIG. 1. In FIG. 4, control units 41 and 42 are provided in association with forward converters or rectifiers 15 and 16 on a power transmitting side. The control unit 41 fetches data of current Id1 and voltage Ed1 actually applied from the rectifier 15 to a DC transmission line 17 and data of a constant voltage setting value Edp commanded by a central control unit 43 and first and second constant current setting values Idp and Idp', and applies data of an output voltage phase control angle α. The construction of the other control unit 42 is also similar to that of the control unit 41 as just mentioned. Meanwhile, inverters 28 and 29 as inverse converters on a power receiving side are also provided with control units 44 and 45, respectively. The control unit 44 fetches data representing actual current Id3 and voltage Ed3 in the inverter 28 and data representing set values of constant voltage and constant current from the central control unit 43. The control unit 45 is also constructed similarly.

Figure 5:
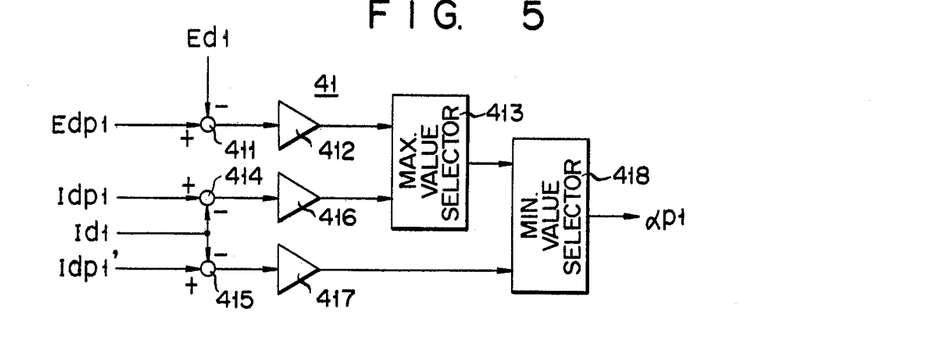
FIG. 5 is a block diagram of a control unit for the forward converter used in the circuit shown in FIG. 4.

The construction of the control unit 41, as an example of those control units, will be described in detail referring to FIG. 5. In the figure, actual voltage data Ed1 in the rectifier 15 is applied to a minus (−) terminal of a difference circuit 411. A plus (+) terminal of the difference circuit 411 is supplied with the data Edp1 representative of a set value of constant voltage. A difference signal obtained by the difference circuit 411 is applied to an input terminal of a constant voltage control circuit 412. The constant voltage control circuit 412 produces a signal representative of a voltage controlling phase angle in accordance with the difference signal and applies it to one of input terminals of a maximum value selector 413. The actual current data Id1 in the rectifier 15 is applied to minus (−) terminals of two difference circuits 414 and 415. A plus (+) terminal of the circuit 414 is supplied with the set value data Idp1 of the first constant current from the central control unit 43, while a plus (+) terminal of the circuit 415 is supplied with the setting value data Idp1' of the second constant current. Difference signals from the circuits 414 and 415 are supplied to constant current control circuits 416 and 417, respectively. In accordance with levels of the difference signals obtained from the circuits 414 and 415, the constant current control circuits respectively produce signals representing voltage controlling phase angles and apply them to the other input terminal of the maximum value selector 413 and one of the input terminals of a minimum value selector 418. The maximum value selector 416 compares the phase angles of the two signals supplied from the constant voltage control circuit 412 and the constant current control circuit 416. Through the comparison, the selector 413 selects the signal of the larger phase angle and applies it to the other input terminal of the minimum selector circuit 418. For example, the signal supplied from the constant voltage control circuit 412 has the phase angle $\alpha=15°$ and the signal from the first constant current control circuit 416 has the phase angle $\alpha=0°$, the maximum value selector 413 selects the signal of $\alpha=15°$ from the circuit 412 and transfers the selected signal to the minimum value selector 418. Further, the signal transferred from the constant current control circuit 417 has the phase angle $\alpha=180°$, the selector selects and produces the signal of the smaller phase angle $\alpha=15°$ from the maximum value selector 413, as an output signal $\alpha p1$. The output signal $\alpha p1$ from the selector 418 determines a phase angle $\alpha$ of an operation voltage Ed1 of the rectifier 15. The operating voltage Ed1 is expressed $$Ed1 = V0\cos\alpha - \frac{3}{\pi} Id1$$

As seen from the equation, the operating voltage Ed1 takes a positive maximum value when $\alpha=0°, 360°$, a minimum value when $\alpha=90°, 270°$, and a negative maximum value when $\alpha=180°$. The circuit of FIG. 5 may be further provided with a device for a constant marginal angle control, if necessary.

Figure 6:
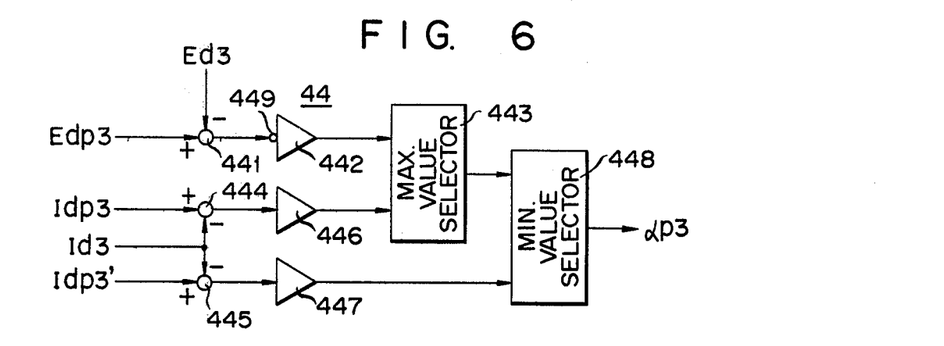
FIG. 6 is a block diagram of a control unit for the inverse converter used in the circuit shown in FIG. 4.

Turning now to FIG. 6, there is shown an arrangement of the control unit 44 as an example of the control units for inverters on the power receiving side. The basic construction of the control unit 44 is the same as that of the control unit 41 shown in FIG. 5 except that an inverter 449 is provided at the input side of the constant voltage control circuit 442. Accordingly, like portions in FIG. 6 are designated by reference numerals of which the second digit numbers are different from those of FIG. 5. As recalled, in the case of FIG. 5, an output signal from the difference circuit 411 is supplied to the constant voltage control circuit 412. In the control unit 44 of the case in FIG. 6, an output signal from the difference circuit 441 is inverted by the inverter 449 and is supplied to the constant voltage control circuit 442. For example, the output signal from the circuit 441 has the phase angle $\alpha=15°$, the phase angle of the output signal from the inverter 449 is $\alpha=15°+180°=195°$.

Figure 7:
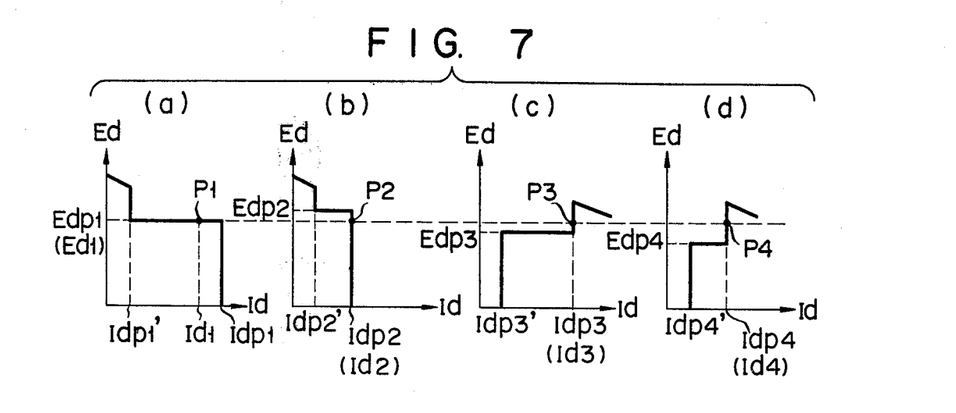
FIGS. 7(a) to 7(d) are characteristic curves useful in explaining the operation of the embodiment shown in FIG. 4 in a normal operating mode.
Figure 8:
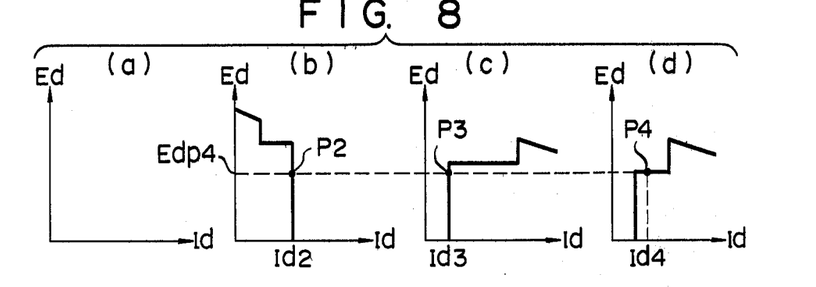
FIGS. 8(a) to 8(d) to FIGS. 11(a) to 11(d) are characteristic curves useful in explaining the operation of the embodiment shown in FIG. 4 in different fault operating conditions.

Relationships each between the constant voltage set value and the constant current set value in the control units 41, 42, 44 and 45 in FIG. 4 will be described with reference to FIG. 7. Supplied to the control unit 41 to control the rectifier 15 are constant voltage set value Edp1 and the constant current set value Idp1, as shown in FIG. 7(a). The constant voltage set value Edp1 is selected substantially equal to a rated voltage in the multiterminal DC power transmission system, for example. Accordingly, in a normal condition, the actual normal operating voltage Ed1 is substantially equal to the set value Edp1. The constant current set value Idp1 is set at a value slightly larger than the operating current Id1 in a normal condition. The constant current set value Idp1' may be a minimum current value of the rectifier 15. Essentially, a value to be set is that the sound inverter is never in an overload condition for an expected fault.

The constant voltage set value Edp2, which is larger than the constant voltage set value Edp1 as shown in FIG. 7(b), is set in the control unit 42 for controlling the rectifier 16. The first constant current set value Idp2 is set substantially equal to the operating current Id2 in a normal condition, and the second constant current set value Idp2' is set approximate to the constant current set value Idp1'.

The constant current set values Edp3 and Edp4 in the inverters 28 and 29 are both set at values smaller than the minimum value of the forward converters 15 and 16, which is the Edp1 in this case, but as the values being different from each other. In this case, as shown in FIGS. 7(c) and 7(d), the constant voltage set values Edp3 and Edp4 must be Edp3>Edp4. Further, the constant current set values Idp3 and Idp4 are set to satisfy the following relations Id1+Id2=Id3+Id4

Accordingly, as shown in FIG. 7(a), the constant current set value Idp1 is set at a value a current margin $\Delta I$ larger than the operating current Id1 in a normal condition.

Generally, in the forward converter 15, when the DC voltage ED1 in the power transmission system falls off from the constant voltage set value Edp1, the current Id1 is controlled so as not to exceed the first constant current set value Idp1 (which is determined by load conditions and the like) by the first constant current control unit 416. The second constant current control unit 417 so controls the current Id1 as to fall below the second constant current set value Idp1' for the DC voltage Ed1 higher than the constant voltage set value Edp1. The controls by the control unit 41 are applicable similarly for the other forward converter 16.

Further, the first constant current control unit 446 controls the inverter 28 so that the current Id3 does not exceed the first constant current set value Idp3 for the DC system voltage Ed3 higher than the constant voltage set value Edp3. The second constant current control unit 417 so controls the current Id3 as not to fall below the second constant current set value Idp3' (which may be the minimum current value of the converter but must be a value never losing the current margin in an expected fault) for the DC voltage Ed3 lower than the constant voltage set value Edp3. The controls are correspondingly applicable for the other inverter 29.

A converter to determine the DC voltage in a power transmission system through the constant voltage control in a stationary operation mode is a rectifier with the lowest constant voltage set value or an inverter with the highest constant voltage set value. The remaining rectifiers and inverters are subjected to the constant current control by the first constant current control units 416, 446, etc. The first constant current control set value Idp of the converter operating at a constant voltage is set at a value the current margin $\Delta I$ larger than the operating current determined by the other converter operating at the constant current.

The operation of the embodiment shown in FIG. 4 will be described by using a practical example, referring to FIGS. 7 to 11. In example, the constant voltage set value Edp1 of the rectifier 15 was 500 kV; the constant voltage set value Edp2 of the forward converter 16 was 525 kV; the constant voltage set value Edp3 of the inverter 28 was 475 kV; the constant voltage set value Edp4 of the inverter 29 was 450 kV; Idp1'=Idp2'=Idp3'=Idp4'=200 A; the first constant current set values Idp1 and Idp2 are 1,000 A and 500 A; Idp3 was 800 A; Idp4 was 500 A. The respective converters safely operate at the operation points P1 to P4 as shown in FIGS. 7(a) to 7(d).

The output current Id1 was 800 A through the constant voltage control of the rectifier 15. The rectifier 16 and inverters 28 and 29 are constant-current-controlled, so that the output currents Id2, Id3 and Id4 are 500 A, 800 A and 500 A, respectively. The sum current (Id1+Id2) of the output currents from the rectifiers 15 and 16 equals to the sum current (Id3+Id4) of the currents of the inverters 28 and 29, resulting in a stable operation.

Under this condition, the control units, 41, 42, 44 and 45 of the converters produce the following signal. In the forward converter 15, for example, as shown in FIG. 5, Ed1=500 kV for Edp1=500 kV. Accordingly, the output signal from the difference circuit 411 is zero and the voltage control unit 412 produces a signal with a control angle (normally, $\alpha=20°$) to allow the output voltage from the forward converter 15 approximates to the rated voltage. The first constant current control unit 416 has a feedback signal corresponding to Id1=800 A for the constant current set value Idp1=1,000 A. Therefore, it produces a signal to raise the output voltage of the forward converter 15 to its maximum value, that is, a signal corresponding to the control angle $\alpha=0°$ (actually, the control angle never becomes 0° because of the use of a limit circuit, but the 0° is used here for ease of explanation), and the maximum value selector 413 produces a signal corresponding to the control angle $\alpha=20°$.

The second constant control circuit 417 has a feedback signal of Id1=800 A for the reference value Idp1'=200 A. Therefore, it produces a signal to remarkably drop the output voltage of the forward converter 15, that is, a signal corresponding to the control angle $\alpha=180°$ (actually, the use of a limit circuit never provides 180°, but the 180° is used here for ease of explanation). Accordingly, the minimum value selector 418 produces a signal $\alpha p$ corresponding to the smaller control angle 20° of those 20° and 180° derived from control unit 413. The signal $\alpha p$ is a signal corresponding to a control angle to keep output voltage from the forward converter 15 at 500 kV, as described above, and eventually the forward converter 15 is in a constant voltage control mode.

In the forward converter 16, Ed2=Ed1=500 kV for a signal correspond to Edp2=525 kV if a voltage drop across power transmission line is neglected. Therefore, the constant voltage control unit (corresponding to the control unit 412 in FIG. 5) produces a signal corresponding to the control angle $\alpha=0°$ to maximizing the output voltage of the forward converter 16. First constant current control unit (corresponding to control unit 416 in FIG. 5) has a signal corresponding to Id2=500 A for a signal corresponding to Idp2=500 A, so that it produces a signal correspond to 0° or more, for example, $\alpha=20°$. The second current constant control unit (corresponding to the control unit 417 in FIG. 5) has a signal correspond to Id2=500 A for Idp2'=200 A, with the result that it produces a signal to minimize the output voltage from the forward converter 16, i.e., a signal corresponding to $\alpha=180°$. Therefore, the maximum value selector produces a signal corresponding to $\alpha=20°$ and the minimum value selector also produces a signal corresponding $\alpha=20°$. Accordingly, the forward converter 16 is in a constant current control mode by a signal corresponding to the control angle $\alpha=20°$.

In the inverse converter 28, a polarity of inverting circuit 449 is provided on the input side of the voltage control unit 442, as shown in FIG. 6. In this case, a difference circuit with opposite polarity may be used as the circuit 441. Accordingly, a signal obtained is the one corresponding to Ed3=500 kV for Edp3=475 kV, so that a signal representing a difference delivered from difference circuit 441 is positive and constant voltage control unit 442 produces a signal corresponding to $\alpha=0°$. The first constant current control unit 446 is supplied with a signal corresponding to Id3=800 A and Idp3=800 A and produces a signal corresponding to $\alpha=130°$. In the second constant current control unit 447, Id3=800 A for Idp3=200 A. Accordingly, a difference signal from the difference circuit 445 is negative and the second constant current control unit 447 produces a signal correspond to $\alpha=180°$. As a result, the maximum value selector 443 and the minimum value selector 448 both produce signals corresponding to $\alpha p3=130°$, respectively, and hence the inverse converter 28 is in a constant current control mode.

Similarly, the inverse converter 29 is also in a constant current control mode.

The explanation to follow is elaboration of the operation when ground fault F1 takes place in a DC power transmission system and it is removed by opening the DC breakers 19 and 21.

In FIGS. 8(a) and 8(b) illustrating operation characteristics in this case, the current from the foward converter 15 becomes zero as shown in FIG. 8(a) and therefore the inverse converter 29 is in a constant voltage control mode by the voltage Edp4, as shown in FIG. 8(d) so that Id2=Id3+Id4. And the forward and inverse converters 16 and 28 perform the constant current control, as shown in FIGS. 8(b) and 8(c).

Figure 9:
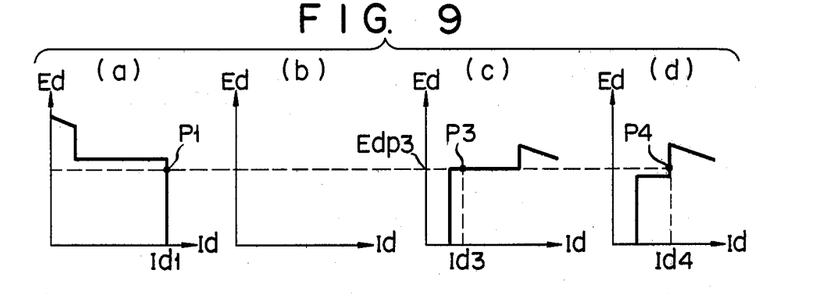
Figure 10:
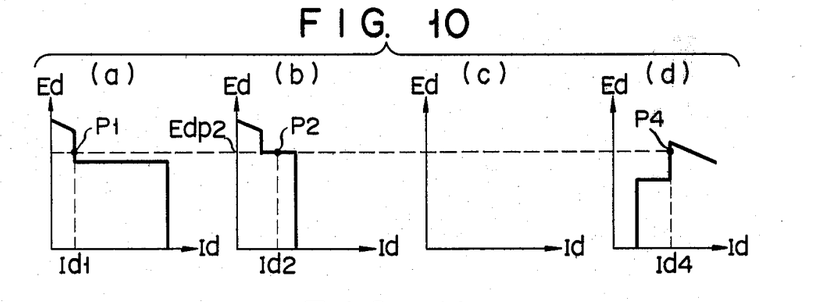
Figure 11:
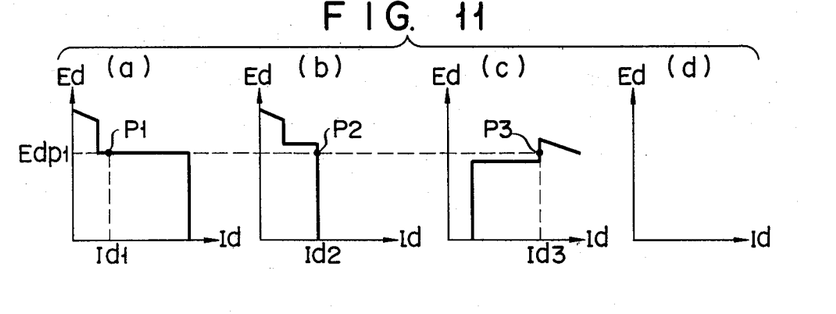

FIGS. 9 to 11 show operating points P after the ground faults F2, F3 and F4 are removed by the DC breakers (20, 22), (24, 26) and (25, 27). As shown, a single converter (the inverter 28, the rectifier 16 or the rectifier 15) determines an operation voltage through the constant voltage control with the set value before the fault occurs, as mentionerd above, while the remaining converters determine the current through the constant current control. As a result, the power transmission system in which stable operating points P are obtainable can be kept stably in operation.

While a case where the ground fault occurs in the DC power transmission system has been described, the invention is applicable for a case where the converter is troubled by some cause to be disconnected from the power transmission system. Further, two or more converters may be used in parallel for each converter in the above-mentioned embodiment. It is evident that the present invention is applicable not only for the 4-terminal DC power transmission system shown in FIG. 1 but also other multiterminal power transmission systems.

As seen from the foregoing description, when a fault takes place in a power transmission system, a multiterminal DC power transmission system according to the present invention quickly removes the fault by gate-blocking the trouble converter or releasing the DC breakers but without waiting the determination of a power redistribution by the central control unit, so that the transmitted power can be restored to the original one with a minimum instability of the power transmission system.

In the case of the ground fault, the control system will normally reclose circuit breakers in the power transmission system. When the reclosing is successfully made, no change of the set values is required. The operating condition before the fault occurs can be restored. On the other hand, when the reclosing fails, the central control unit determines new setting values to redistribute the electric power. The calculation for the power redistribution can be started at the time of detecting the fault, so that a time taken for the calculation is sufficient.

Further, the forward converter with a high voltage setting value and the inverse converter with a lower voltage set value are controlled by the first constant current control device before and after the fault takes place, thus resulting in little change of the power quantity.

Therefore, a scram in a nuclear power plant can be prevented by setting of a high value the constant voltage setting value of the converters connected to the power plant. Further, by setting at a low value the constant voltage set values of the inverse converters connected to an important power consuming area, a stable power supply to the area is ensured.

The power transmission system can smoothly stop the operation of the converters, for example, in addition to the stop at a transient time of the fault, for example. For stopping a converter performing the constant current control, all an operator has to do is to reduce the set value of the first constant current control device to zero, independently of the remaining converters. If sufficient time may be taken, it is preferable to change the constant current set values of the remaining converters. For stopping the converter performing the constant voltage control, the current margin is shifted to the other specific converters (the converter with the highest constant set value or the lowest constant set value) and then the first constant current value of the converter to be stopped is set to zero. Also in this case, if the sufficient time may be taken, it is preferable to change the set values including the constant voltage set values.

In the DC system currently operating, if an additional converter should erroneously be driven, the converter never lose the current margin or is never forced to be in an overload condition.

Additionally, the power transmission system according to the invention can properly operate in accordance with proper commands from the central control unit and can secure stable operating points in the transient time, without the assistance of the data transmission systtem and the central control unit, thus resulting in remarkable improvements of the reliability of the multiterminal DC power transmission system.

What we claim is:

1. A multiterminal DC power transmission system having a plurality of forward converters and inverse converters, in which said forward and inverse converters are respectively provided with control units including constant voltage control means, different constant voltages are set in said converters by said constant voltage control means and the minimum value of those constant voltage set values of said forward converters is larger than the maximum value of those constant voltage set values of said inverse converters.

2. A multiterminal DC power transmission system according to claim 1, in which said control units provided associative with said forward converters include each a first constant current control means for controlling so that currents exceed the first constant current set values for voltage lower than the constant voltage set values, and a second constant current control means for controlling so that the current does not fall below second constant current set values for a voltage higher than the constant voltage set values.

3. A multiterminal DC power transmission system according to claim 1 or 2, in which said control units provided with said inverse converters include each a third constant current control means for controlling so that current does not exceed a first current set value for voltage higher than the constant voltage set value, and a fourth constant current control means for controlling so that the current does not fall below a second constant current set value for a voltage lower than the constant voltage set values.

4. A multiterminal DC power transmission system according to claim 3, in which said control units include each a maximum value selecting circuit supplied with an output signal from said voltage control means and an output signal from said first constant current control means, and a minimum value selecting circuit supplied with an output signal from said maximum value selecting circuit and an output signal from said second constant current control means.

5. A multiterminal DC power transmission system according to claim 4, in which said control units are each controlled by set value data from said central control unit.

* * * * *

UNITED STATES PATENT AND TRADEMARK OFFICE
CERTIFICATE OF CORRECTION

PATENT NO. : 4,419,591
DATED : December 6, 1983
INVENTOR(S) : Shoichi Irokawa et al.

It is certified that error appears in the above—identified patent and that said Letters Patent is hereby corrected as shown below:

Claim 2, line 5, change "currents exceed" to -- current does not exceed --.

Claim 3, line 2, delete "or 2".

Claim 4, line 2, change "claim 3" to -- claim 2 or 3 --.

Signed and Sealed this

Third Day of December 1985

[SEAL]

Attest:

DONALD J. QUIGG

Attesting Officer     Commissioner of Patents and Trademarks